Dec. 2, 1969 J. R. BENNETT ET AL 3,482,213

DIGITAL DATA TRANSPARENT TRANSMISSION MEANS

Filed March 27, 1967 4 Sheets-Sheet 1

DIGITAL DATA TRANSPARENT TRANSMISSION MEANS

Filed March 27, 1967 4 Sheets-Sheet 2

INVENTORS.
JAMES RUSSELL BENNETT
RONALD R. BROOKMAN
BY Christie, Parker & Hale
ATTORNEYS Dec. 2, 1969 J. R. BENNETT ET AL 3,482,213

DIGITAL DATA TRANSPARENT TRANSMISSION MEANS

Filed March 27, 1967 4 Sheets-Sheet 3

DIGITAL DATA TRANSPARENT TRANSMISSION MEANS

Filed March 27, 1967

INVENTORS.
JAMES RUSSELL BENNETT
RONALD R. BROCKMAN
BY
Christie, Parker & Hale
ATTORNEYS United States Patent Office 3,482,213

Patented Dec. 2, 1969

3,482,213
DIGITAL DATA TRANSPARENT TRANSMISSION MEANS

James Russell Bennett, Glendora, and Ronald R. Brookman, Pasadena, Calif., assignors to Burroughs Corporation, Detroit, Mich., a corporation of Michigan Filed Mar. 27, 1967, Ser. No. 626,175
Int. Cl. G11b *13/00;* G06f *1/00, 7/00*
U.S. Cl. 340—172.5 5 Claims

ABSTRACT OF THE DISCLOSURE

A data communication system in which data may be transmitted between a main memory and peripheral units in a completely transparent mode wherein no special characters within the transmitted data are detected. An address memory is provided which contains address words used for addressing the memory and has two word locations reserved therein for each peripheral unit. During each memory cycle allocated to a particular peripheral unit engaged in transparent transmission, means are provided to effect the storage of a transmitted character into, or the fetch of a transmitted character from, the memory address stored in a particular word location in address memory which is associated with the particular peripheral unit. Means are provided to increment the address in this particular word location during each such memory cycle and to compare it with a memory address stored in another particular word location in address memory which is also associated with the particular peripheral unit.

BACKGROUND OF THE INVENTION

This invention relates to data communication control and more particularly to data communication systems in which data may be transmitted in a completely transparent mode.

Computer systems in which the main memory of the computer is time-shared by one or more processing units and by a plurality of peripheral devices have become well known in recent years. In such systems, the central control unit allocates requests for accesses to the main memory made by processors and by the peripheral devices. By operating in such a manner, many processing and input-output operations may be executed simultaneously. Consequently, many users may operate the computer simultaneously or apparently simultaneously, in such a way that each is or may be completely unaware of the use being made of the computer by others. Additionally, a number of programs may be executed such that none needs to be completed before another is started or continued. Where several independent processors are utilized in the system, each may have access to a common main memory of the system.

In the systems described in the preceding paragraph, the central control unit of the system allocates accesses to main memory which are requested by the various devices. A device having access to the memory during any given memory cycle need not, and probably will not, have access to the memory during the immediately succeeding memory cycle. Thus during successive memory cycles, the memory may be utilized in conjunction with entirely unrelated operations. The device which receives access to memory at any given time is determined on the basis of decisions made by the central control unit which thereby achieves optimum usage of the main memory and assumes all simultaneously performed operations will be executed insofar as possible on the basis such that each of the operations is unaware that others are also being executed.

Transmission of data over long distance via commercially available transmission lines has long been known. Such transmissions may occur, for example, over the Bell System telephone network, over the TWX network, the Telex network, or over leased lines. Recently, the transmission of data over such data communication lines has been made directly communicable with computer systems. Thus a computer system may transmit data via data communication lines directly to, or receive data from, a terminal unit which may be several thousand miles away.

The various input-output units utilized in a computer system having a time-shared main memory ordinarily communicate with the central control unit of the system via a plurality of input-output control units and a plurality of input-output channels. Each input-output unit will often have an individual control unit and an individual input-output channel associated with it. When a large number of data communication lines must communicate with the central control unit, it is often uneconomic to provide an individual control unit and input-output channel for each line. Since the transmission of data over the communication lines is relatively slow, it is possible to provide a single multi-line input-output control unit for all of the data communication lines. Data transmitted over all of the lines is thereby funneled into a single input-output channel between the multi-line control unit and the central control unit.

The input-output control units, whether of the individual or single-line type or of the multi-line type, generally include circuit means for recognizing control code characters within a block of information being transmitted between main memory and an input-output unit. These control code characters designate various functions such as the beginning of text, end of text, and end of transmission, for example. During certain transmissions, however, it is adavntageous to render the input-output control units blind to all such control code characters. No control code characters are then recognized during the execution of a command. For example, transparent transmission is advantageous during the execution of a command which transmits an entire program from one computer to another. There may be many control code characters within the transmitted program but these codes are of no significance with respect to the transmission of a program from one computer to another. Although the system should be blind to control code characters within the transmitted program, nevertheless there must be a means by which the completion of transmission of the program is determined.

This determination of completion of the program transmission has been achieved heretofore by means which involved a number of disadvantages. One prior system, although blind to individual characters, still had to sense each character and to respond to a particular combination of characters which were used to indicate that the end of transmission had occurred. Such a system does not achieve completely transparent transmission, however, since the characters being transmitted are themselves utilized to indicate that transmission is complete. The text of the program being transmitted is therefore not completely unrestricted and certain combinations of characters within the text are prohibited since their presence would falsely indicate that the transmission was completed.

Another prior approach is to generate a false parity error in order to indicate the end of transmission. In response to detection of a parity error, the character with respect to which the error occurs is examined. Whenever a parity error occurs with respect to a particular character, the system concludes that the end of transmission rather than a parity error has been recognized. This approach also requires character recognition and additionally prevents detection of actual parity errors occurring with respect to a particular character.

An advantage of the present invention is that it enables data to be transmitted by a transmission system which is blind both to individual characters being transmitted and to all combinations of transmitted characters.

Another advantage of the present invention is that it enables data to be transmitted by a transmission system which is blind to the transmitted characters and in which false parity errors need not be utilized to indicate that the end of transmission has occurred.

A further advantage of the present invention is that it enables data to be transmitted in a completely transparent manner whereby the transmitted data may comprise a completely unrestricted text wherein all $2^n$ characters of an n-bit internal code may be utilized.

Summary of the invention

In brief, the preceding and additional advantages are achieved by means of an address memory of the type described in the copending patent application of J. R. Bennett and Roger E. Packard, Ser. No. 626,176, filed on even date herewith and assigned to the assignee of the present invention. The address memory contains address words used for addressing the main memory. The address memory has two words locations reserved therein for each of a plurality of input-output units which may communicate with main memory. When data is to be transmitted between the main memory and a particular one of the input-output units in a completely transparent manner, the first word location in address memory reserved for the particular input-output unit stores the address of the location in main memory where the next character of transmitted data is to be stored or fetched. The second word location in address memory reserved for the particular input-output unit stores the address of the location in main memory of the last character of the transmission. During each memory cycle allocated to the particular input-output unit, a transmitted character is stored in or fetched from the address which is stored in the first word location. This address word is then incremented so that the first word location continues to store the address of the location in main memory where the next character of transmitted data is to be stored or fetched. Also during each memory cycle, the contents of the second word location is sensed and compared with the contents of the first word location. When the contents of the two locations in address memory reserved for the particular input-output unit are determined to be equal, the system recognizes that the end of transmission has been reached. The present invention thus provides a novel apparatus for effecting completely transparent transmission of data between main memory and a particular input-output unit. Additionally, the present invention may be utilized in conjunction with non-transparent transmissions in order to prevent such transmissions from overrunning their proper section within main memory.

BRIEF DESCRIPTION OF THE DRAWING

The manner of operation of the present invention and the manner in which it achieves the above and other advantages may be more clearly understood by reference to the following detailed description when considered with the drawing in which:

FIG. 1 depicts a computer system which utilizes the present invention. It depicts a system similar to that described in conjunction with the copending application of J. R. Bennett and Roger E. Packard, previously referred to, and which may be considered incorporated by reference herein. FIG. 1 shows central processing unit 10, main memory 11, and central control unit 12. Main memory 11 is time-shared by processor 10 and a plurality of input-output units 13, 14, 15, and 16. Access to memory 11 by the processor and the input-output units is controlled by the central control unit 12. Consequently, a plurality of input-output operations may proceed simultaneously and many users may thereby utilize the system concurrently in such a way that each can be completely unaware of the use of the system being made by others; whenever the processor or any of the input-output units desire access to memory 11 they transmit a signal to central control unit 12 indicating this desire. The central control unit 12 then handles these requests for memory access and allocates memory accesses to the processor and the input-output units. The control unit 12 has a plurality of input-output channels which are utilized for the transmission of data between the main memory 11 and the input-output units. The central control unit 12 has a fixed number of such input-output channels and will be considered for purposes of description herein to have twenty such input-output channels.

Figure 1:
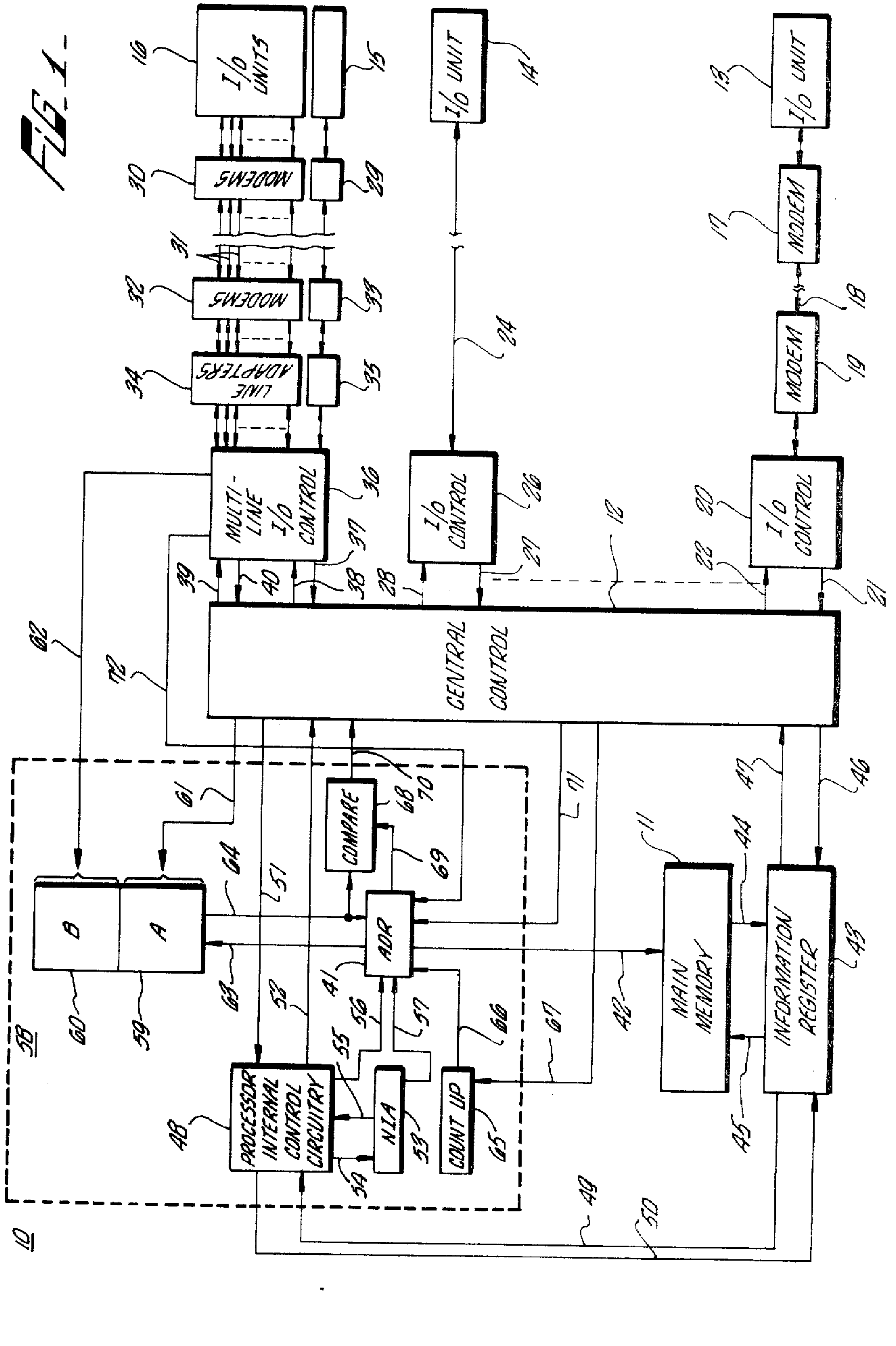
FIG. 1 depicts a block diagram of a computer system which utilizes the present invention.

In put-output unit 13 is connected to a first input-output channel of control unit 12 via modulator-demodulator (hereinafter modem) 17, line 18, modem 19, and input-output control unit 20. The first input-output channel is indicated by lines 21 and 22. Although the lines 21 and 22 are shown in FIG. 1 as single lines for the purposes of clarity, in actuality many lines will be utilized to transmit signals between control unit 20 and central control unit 12. Similarly, other lines shown in the drawing as single lines for the purpose of clarity, in actuality constitute a plurality of lines. Input-output unit 14 is directly connected to the eighteenth input-output channel by input-output control unit 26 via line 24. This eighteenth input-output channel is indicated by lines 27 and 28. Input-output unit 14 may be, for example, a card reader or teletype unit, neither or which requires a modem. Input-output unit 15 and input-output units 16 are connected to the nineteenth and twentieth input-output channels by modems 29 and 30, lines 31, modems 32 and 33, line adapters 34 and 35 and multi-line input-output control unit 36. The nineteenth input-output channel is indicated by lines 37 and 38, while the twentieth input-output channel is indicated by the lines 39 and 40.

As described in conjunction with the copending application referred to previously, the multi-line control unit 36 serves to connect a plurality of input-output units to a single pair of channels. For purposes of description herein, the input-output units designated 16 are considered to comprise thirty-five individual input-output units. Similarly, the modems 30, modems 32 and line adapters 34 all comprise thirty-five separate units associated respectively with the thirty-five input-output units. The nineteenth input-output channel is utilized to transmit commands between control unit 12 and multi-line control unit 36, while the twentieth input-output channel is utilized to transmit data between these control units. Data transmitted between the computer system and the thirty-six input-output units connected to multi-line control unit 36 via data communication lines 31 are thus funneled into a single input-output channel connecting control units 36 and 12. As a result, the total number of input-output units which may be served by central control unit 12 has been increased from twenty to fifty-four.

Within the central processing unit 10 is address register 41 which is utilized to address main memory 11 via line 42. Information is read from memory 11 to information register 43 via line 44 and is written into memory 11 from register 43 via line 45. Register 43 is connected to central control unit 12 via lines 46 and 47 and to control circuitry 48 within processor 10 via lines 49 and 50. Control circuitry 48 is connected to central control unit 12 via lines 51 and 52, to next instruction address register 53 within processor 10 via lines 54 and 55, and to address register 41 via line 56. Register 53 contains the address of the next instruction of a stored program being executed by processor 10. Register 53 is connected to address register 41 by line 57. Also located within processor 10 is address memory 58 which comprises a section 59 and a section 60 which will hereafter sometimes be referred to as the "A" and "B" sections, respectively, of address memory 58.

Address memory 58 may advantageously be made up of a number of cards containing integrated transistor storage devices. Such cards are described, for example, in the copending application of Edwin S. Lee, III, Ser. No. 278,021, filed on May 6, 1963, and assigned to the assignee of the present application Patent No. 3,418,639. Although address memory 58 is made up of such integrated circuitry, it operates in the manner of a word-organized core memory Section "A" of address memory 58 is addressed via line 61 only by central control unit 12. Section "A" of address memory 58 has two word locations reserved therein for each of the input-output channels which connect central control unit 12 to the input-output control units and has, additionally, two or more word locations reserved for use by processor 10 itself. Section "B" of address memory 58 is addressed via line 62 only by the multi-line control unit 36.

Address register 41 serves as an information register for address memory 58, as well as an address register for memory 11. Addresses in main memory 11 are written into address memory 58 from register 41 via line 63 and are written from memory 58 into register 41 via line 64. When information is written into or read from memory 11 during any given memory cycle, the contents of address register 41 will ordinarily be incremented by count-up circuitry 65 via line 66 prior to the next succeeding memory cycle. The incrementing operation is under the control of central control unit 12 by line 67 which connects control unit 12 and circuitry 65. For purposes of description herein, memory 11 will be assumed to store individually addressable four-bit digits. It further will be assumed, however, that these digits will ordinarily be written into read from memory 11 two digits at a time. Thus, during each memory cycle count-up circuitry 65 will ordinarily increment the contents of address register 41 by two. Additionally, during each memory cycle, comparison circuit 68 will sense the contents of the second word location in address memory 58 reserved for the particular one of the input-output units which has been allocated access to memory 11. Comparison circuit 68 will compare the contents of this second word location with the contents of address register 41 before the contents of register 41 are returned to the first word location in address memory 58 reserved for the particular input-output unit which has been granted access to memory 11. Comparison circuit 68 is connected to register 41 by line 69 and to control unit 12 by line 70. It also is connected to sense line 64.

During the operation of the system shown in FIG. 1, input-output commands are transferred two digits at a time to the input-output control unit of the input-output units to which they relate. After such a command has been received in full by the control unit, a channel result descriptor word is stored in memory 11 at a predetermined location therein, thereby designating that the complete command has been received. The address at which this descriptor word is to be stored is set into address register 41 by central control unit 12 via line 71. When the input-output command relates to one of the input-output units associated with the multi-line control unit 36, the channel descriptor word stored in memory 11 by line 71 indicates that the nineteenth input-output channel is again free to receive an input-output command directed to a different one of the input-output units associated with multi-line control unit 36. When a command has been executed by the multi-line control unit 36, a second descriptor word is stored in memory 11 from multi-line control unit 36 via line 72 connected between input-output control unit 36 and address register 41.

During the operation of the system depicted in FIG. 1, the central control unit 12 allocates accesses to main memory 11 requested by the processor, by the eighteen input-output units associated with the first eighteen input-output channels, and by the thirty-six input-output units associated with the nineteenth and twentieth input-output channels by means of multi-line control unit 36. All of these fifty-five devices may be operating simultaneously such that each is virtually unaware of the fact that memory 11 is also being addressed by the other devices. Thus, while only one of the devices will have access to memory 11 during any given memory cycle, any of the other devices may be allocated access to the memory during the immediately succeeding memory cycle. It is the central control unit 12 which determines which of the devices has access to memory 11 during any given memory cycle. The general operation of the system depicted in FIG. 1 is described in the copending application of Bennett and Packard referred to hereinbefore, and will not be repeated herein except in connection with the particular transparent transmission operation which may be performed by the system of FIG. 1.

Figure 5:
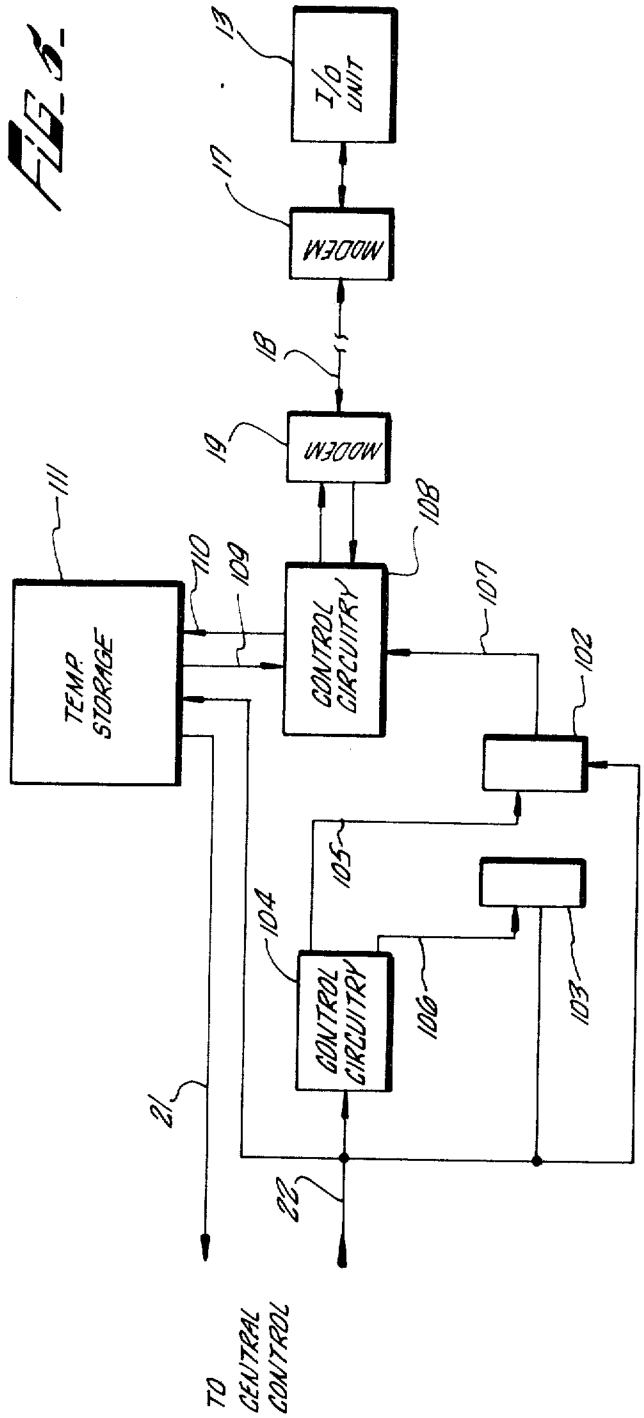
FIG. 5 depicts in greater detail one of the single line control units shown in FIG. 1.
Figure 2:
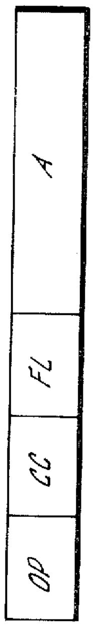
FIGS. 2 and 3 depict illustrative commands which may be executed by the system shown in FIG. 1.
Figure 3:
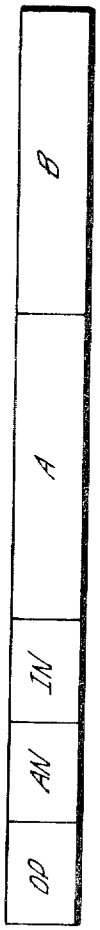
Figure 4:
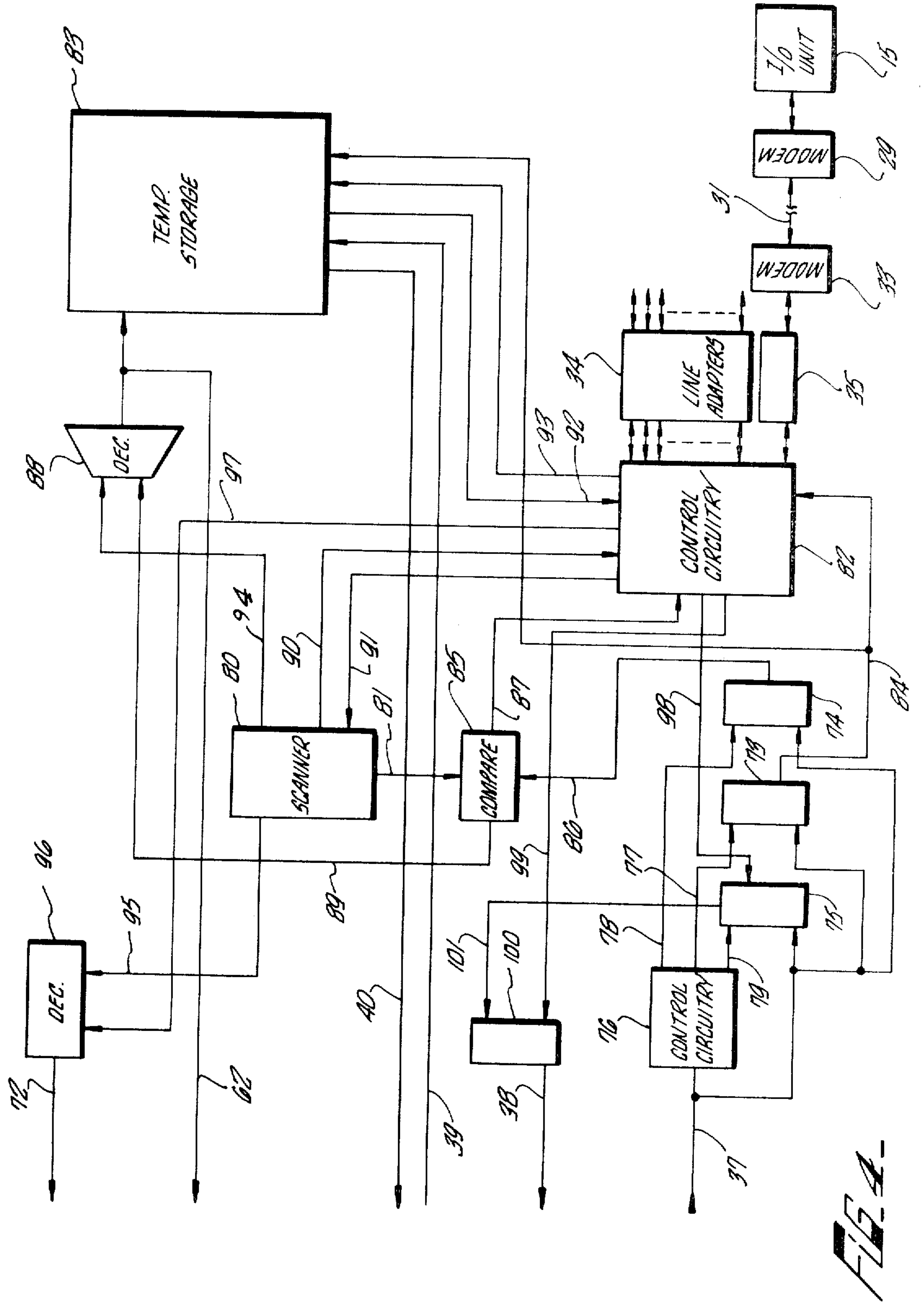
FIG. 4 depicts in greater detail the multi-line control unit shown in FIG. 1.
Figure 6:
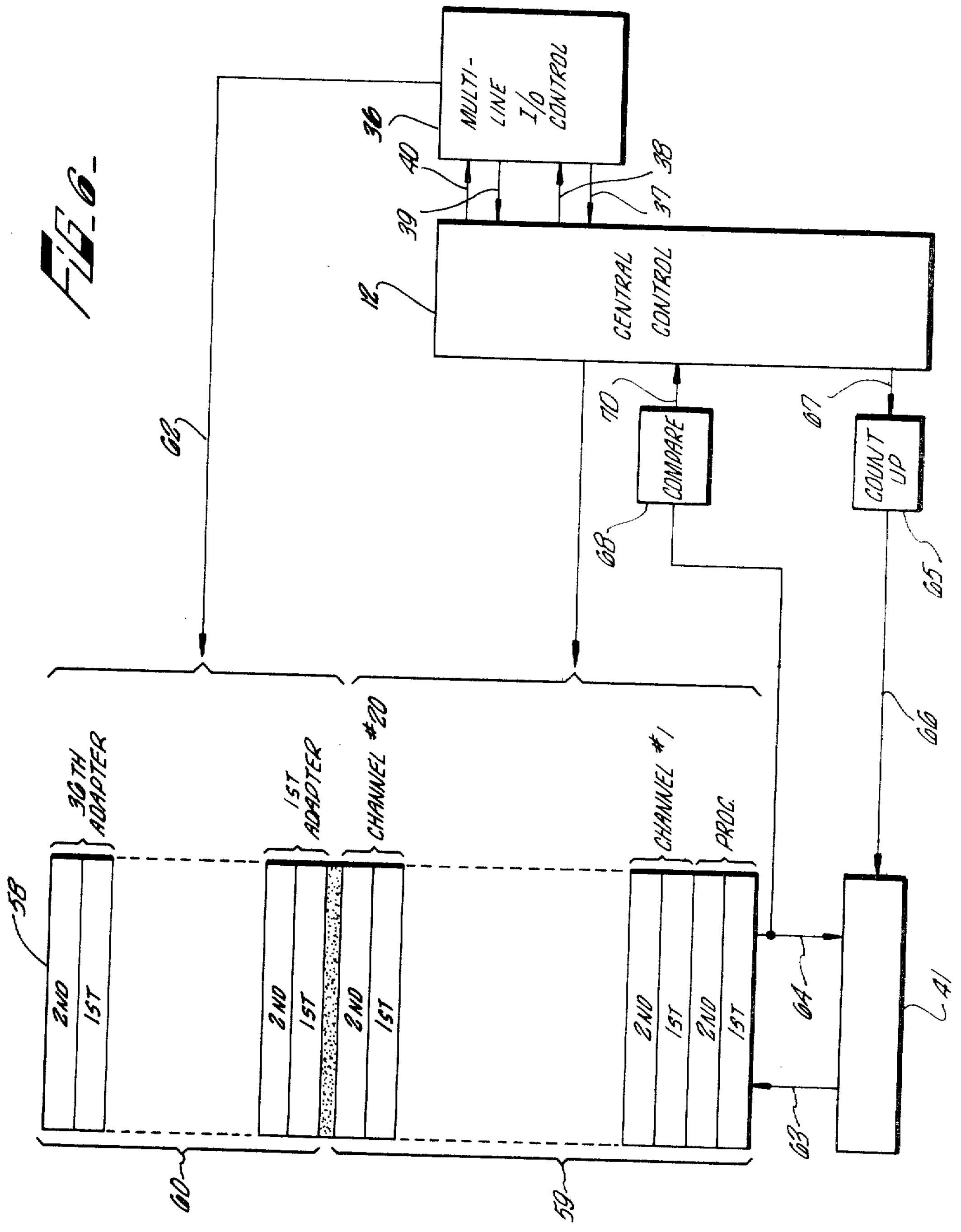
FIG. 6 depicts in greater detail the address memory and associated circuitry shown in FIG. 1.

FIGS. 2 and 3 depict exemplary commands which may be utilized in the computer system of FIG. 1. FIGS. 4, 5 and 6 depict in greater detail particular portions of FIG. 1. Elements common to FIG. 1 and the remaining figures bear the same reference characters in all figures.

FIG. 2 depicts an "initiate input-output" command which is part of a program being executed by processor 10. The command shown in FIG. 2 is made up of two syllables, each of which comprises six digits. The first two digits, designated OP, indicate that an input-output command is to be performed. The next two digits, designated CC, indicate the input-output channel which is to be utilized. The next two digits, designated FL, indicate the field length of the input-output command to be executed. It will be assumed that the command to be executed is that depicted in FIG. 3 and that the field length indicated is three syllables. The second syllable of the "initiate input-output" command shown in FIG. 2 indicates the address of the input-output command which is to be executed. Initially, the next instruction address register 53 contains the address of the first digit of the command shown in FIG. 2. This address will be transferred from next instruction address register 53 to address register 41. When a processor memory access is granted by central control unit 12, the two OP digits will be read out of memory 11 and stored in processor control circuitry 48. The address stored in register 41 will then be incremented by two by circuitry 65 and stored into a location in Section "A" of address memory 58 reserved for the processor. During subsequent memory accesses granted to the processor by central control unit 12, the remainder of the command shown in FIG. 2 will be read out of memory 11 and transferred to processor control circuitry 48. When the command has been fully read out of memory 11, circuitry 48 indicates to central control unit 12 via line 52 that an input-output command is to be performed and that the command relates to a particular one of the input-output channels. Circuitry 48 also inserts the address contained in the command of FIG. 2 into address register 41 via line 56. This address is the address of the first digit of the command depicted in FIG. 3. The processor then commences to fetch the command depicted in FIG. 3 and to transfer the first syllable of this command to the input-output control unit associated with the input-output channel specified by the command of FIG. 2.

Assume first that the input-output command of FIG. 3 specifices that a "write-transparent" command is to be executed and that data is to be transmitted to input-output unit 15. Since input-output unit 15 is associated with multi-line control unit 36, the "initiate input-output" command of FIG. 2 would have specified an input-output channel associated with control unit 36. The first two digits of the command of FIG. 3, designated OP, specify that a "write-transparent" command is to be executed. The next two digits, designated AN, indicate that data is to be transmitted to input-output unit 15. The next two digits of the command, designated IN, constitute variant digits which in certain circumstances may effect changes either in the OP or AN digits. For the purposes of the present discussion, the IN digits will not be utilized. During the fetch of the command depicted in FIG. 3, the first syllable of the command, comprising the OP, AN, and IN digits, is sent to control unit 36 and the second and third syllables of the command are stored, respectively, in the first and second word locations reserved in section "B" of the address memory 58 for input-output unit 15. The second syllable denoted "A" indicates the address in memory 11 where the first character which is to be transmitted to input-output unit 15 is stored. The third syllable of the command of FIG. 3 designated "B" denotes the address in memory 11 of the last character which is to be transmitted to input-output unit 15.

FIG. 4 depicts in greater detail the multi-line control unit 36 of FIG. 1. The operation of the circuitry shown in FIG. 4 is described in detail in the copending application of Bennett and Packard, referred to previously, and will not be repeated herein. The OP, AN and IN digits of the command of FIG. 3 are transmitted via the nineteenth input-output channel to registers 73, 74 and 75, respectively, and are directed to these registers by control circuitry 76 and lines 77, 78 and 79, respectively. Scanner 80 sequentially scans the thirty-six line adapters by presenting signals on its output lines 81. Register 73 is connected to control circuitry 82 and temporary storage unit 83 by line 84. The temporary storage unit 83 may advantageously comprise the scratch pad memory and scratchpad information register described in the copending application of Packard and Bennett referred to previously. Register 74 is connected to comparison circuit 85 by line 86. Comparison circuit 85 is also connected to control circuitry 82 by line 87 and to decoding circuitry 88 by line 89. When comparison circuit 85 determines that scanner 80 is pointing at the particular line adapter identified by the contents of register 74, control circuitry 82 causes the contents of register 73 to be transferred to temporary storage unit 83 and causes scanner 80 to halt. Lines 90 and 91 connect scanner 80 with control circuitry 82, lines 92 and 93 connect control circuitry 82 with storage unit 83, line 94 connects scanner 80 to decoder 88, line 95 connects scanner 80 with decoder 96 and line 97 connects control circuitry 82 with decoder 96. Line 98 connects control circuitry 82 to register 75 and line 99 connects control circuitry 82 with control circuitry 100. Line 101 connects register 75 with control circuitry 100. When the contents of register 73 are transferred to storage unit 83 as a result of a comparison detected by circuitry 85, decoder 88 will cause line 62 to address a word location in storage unit 83 reserved for input-output unit 15 and also to address a word location in section "B" of address memory 58 reserved for input-output unit 15.

Control circuitry 82 determines that the input-output command to be performed is a "write-transparent" command. As shown in FIG. 6, the starting and ending addresses associated with this command will now be stored in the two word locations reserved in address memory 58 for input-output unit 15. These locations are identified in FIG. 6 as the lowest two locations within section 60 of address memory 58. Since there are thirty-six input-output units associated with control unit 36, each having a line adapter; and since input-output unit 15 is the first one of these thirty-six units, its reserved locations in address memory 58 are further identified as being the addresses associated with the first adapter.

Prior to the commencement of execution of the "write-transparent" command, control circuitry 82 will have inserted a channel result descriptor word in register 75 which will have been transferred to memory 11 via line 38 and control circuitry 100 indicating that the nineteenth input-output channel is free to receive another input-output command directed to any of the thirty-six input-output units other than unit 15. After the OP digits stored in register 73 have been transferred to storage unit 83, control circuitry 82 determines that a "write-transparent" command is to be performed. As a result control circuitry 82 will not recognize any of the charatcers transmitted from memory 11 to input-output unit 15. At the commencement of this operation, processor 10 will have stored in section 60 of address memory 58 the address of the first character to be transmitted in the first word location, and the address of the last character to be transmitted in the second word location, reserved for the first adapter and input-output unit 15. During the subsequent execution of this command, the contents of the first word location will be read out of address memory 58 into register 41 and two digits stored in memory 11 will be transferred via line 39 to a word location in storage unit 83 reserved for input-output unit 15. This operation will occur whenever central control unit 12 allocates a memory access to input-output unit 15. At the end of each such memory cycle, count-up circuitry 65 will cause the contents of address register 41 to be incremented by two and comparison circuit 68 will compare the contents of register 41 with the contents of the second word location reserved in section 60 of address memory 58 for input-output unit 15. The incremented value stored in register 41 is then restored in the first word location in address memory 58 reserved for input-output unit 15 at the end of each such memory cycle. The above-described operation occurs whenever memory access is granted by control unit 12 to input-output unit 15. The characters read out of memory 11 are transmitted to temporary storage unit 83 via line 39 and subsequently are transmitted to input-output unit 15 under the control of control circuitry 82. Input-outpht unit 15 may advantageously comprise a second computer and the data being transmitted to it in transparent mode may advantageously comprise an entire computer program.

The above-described operations continue until comparison circuit 68 indicates that the contents of the two word locations in address memory 58 reserved for input-output unit 15 are identical. When this occurs, comparison circuit 68 notifies central control unit 12 via line 70 that the command has now been fully executed and that the complete program, or other block of data, has now been completely transmitted to input-output unit 15. When this indication that transmission is complete is received by multi-line control unit 36, it inserts in address register 41 via decoder 96; and line 72 the address of an adapter result descriptor word subsequently stored in memory 11 which indicates that the complete "write-transparent" command has been executed.

The present invention is, of course, not restricted to operations performed in conjunction with input-output units served by the multi-line control unit 36. Thus, it can also be utilized with respect to input-output units such as those served by single-line control units 20 or 26. Furthermore, many such operations may be performed simultaneously. Thus, for example, the "initiate input-output" command depicted in FIG. 2 could have specified the first input-output channel rather than an input-output channel associated with multi-line control unit 36. The command depicted in FIG. 3 could then have, for example, specified a "read-transparent" operation. The execution of such an operation will now be described.

FIG. 5 depicts in greater detail the input-output control unit 20 shown in FIG. 1. During the fetch of a "read-transparent" command directed to input-output unit 13, the OP digits of the command are stored in register 102 and the variant digits of the command are stored in register 103. These digits are transmitted via line 22, control circuitry 104 and lines 105 and 106. Line 107 connects register 102 to control circuitry 108, and lines 109 and 110 connect control circuitry 108 with temporary storage unit 111. The lines 21 and 22 of the first input-output channel are also connected to temporary storage unit 111. After the OP digits have been stored in register 102, they are transferred to control circuitry 108 via line 107. Control circuitry 108 then determines that the operation to be performed is a "read-transparent" operation. During the fetch of this command, the processor 10 also will have stored the "A" and "B" addresses of the command in the first and second word locations reserved in section 59 of address memory 58 for the first input-output channel. The subsequent execution of this command by input-output control unit 20 is very similar to the execution of the "write-transparent" command just described with respect to multi-line control unit 36. Thus, characters transmitted from input-output unit 13, a bit at a time, are assembled in temporary storage unit 111 and subsequently transferred to memory 11 via line 21 under the control of circuitry 108. As each character is transmitted via line 21, it is stored in memory 11 in the address designated by the contents of the first word location reserved in address memory 58 for the first input-output channel.

During each memory cycle allocated to the first input-output channel, the address word stored in the first word reserved in address memory 58 for the first input-output channel is read out into address register 41. The character transmitted from temporary storage unit 111 via line 21 is stored in the memory 11 at the address designated by register 41. The contents of register 41 are incremented by two and comparison circuit 68 then compares the contents of register 41 with the address word stored in the second word location reserved in address memory 58 for the first input-output channel. When comparison circuit 68 determines that these compared quantities are equal it notifies central control unit 12 via line 70 that the "read-transparent" operation has been fully executed.

All of the circuits shown herein as independent blocks are of a type well-known to persons skilled in the art. All of the circuits designated as control circuits, for example, comprise well-known logic circuitry which may easily be designed to perform the functions specified herein for these circuits.

What have been described are considered to be only illustrative embodiments of the present invention and, accordingly, it is to be understood that various and numerous arrangements may be devised by one skilled in the art without departing from the spirit and scope of the invention.

What is claimed is:

1. A computer system compirsing:
- a main memory;
- a plurality of input-output channels communicating with the memory;
- central control means for allocating accesses to main memory by the input-output channels;
- a plurality of data communication lines for transmitting data between the system and a first plurality of remote stations;
- an address memory;
- the address memory having a first and a second section, the first section having a first and a second word location reserved therein for each of the input-output channels, the second section having a first and a second word location reserved therein for each of the data communication lines;
- multi-line control means for selectively coupling the data communication lines to a particular one of the input-output channels;
- first and second address words manifesting particular locations within main memory being stored, respectively, in the two word locations in the second section of the address memory reserved for a particular one of the data communication lines;
- an address register;
- the multi-line control means comprising means responsive to the allocation of access to main memory to the particular one of the input-output channels and to the selection of the particular one of the data communication lines for addressing the second section of the address memory and for effecting the writing of the first address word into the address register;
- means utilizing the contents of the address register for addressing the main memory;
- means for incrementing by a predetermined amount the first address word stored in the address register;
- means for restoring the first address word stored in the address memory to its associated reserved word location in the address memory;
- means for comparing the first and second address words; and
- means responsive to a determination of equality between the first and second address words for presenting a signal indicative of such equality to the central control means.

2. A computer system according to claim 1 further comprising:
- a second plurality of remote stations;
- a plurality of single-line control means coupling respective ones of the second plurality of remote stations to respective other ones of the input-output channels;
- third and fourth address words manifesting particular locations within main memory being stored, respectively, in the two word locations in the first section of the address memory reserved for the input-output channel associated with a particular one of the second plurality of remote stations;
- the central control means comprising means responsive to the allocation of access to main memory to the input-output channel associated with the particular remote station for addressing the first section of the address memory and effecting the writing of the third address word into the address register;
- the utilizing means utilizing the contents of the address register for addressing the main memory;
- the incrementing means incrementing by a predetermined amount the third address word stored in the address register;
- the restoring means restoring the third address word stored in the address memory to its associated reserved word location in the address memory;
- the comparing means comparing the third and fourth address words; and
- the presenting means, responsive to a determination of equality between the third and fourth address words, presenting a signal indicative of such equality to the central control means.

3. A computer system according to claim 2 further comprising:
- processor means for reading an input-output command from main memory;
- the command comprising bits manifesting a particular one of the input-output channels, bits manifesting a starting address in main memory associated with the command and bits manifesting a terminating address in main memory associated with the command; and
- means including the central control means for storing the starting address and the terminating address, respectively, in the first and second of the two word locations in the first section of the address memory reserved for the input-output channel manifested by the command.

4. A computer system comprising:

a main memory;

a plurality of input-output channels communicating with the memory;

central control means for allocating accesses to main memory by the input-output channels;

a plurality of data communication lines for transmitting data between the system and a plurality of remote stations;

an address memory;

the address memory having a first and a second section, the first section having a first and second word location reserved therein for each of the input-output channels, the second section having a first and a second word location reserved therein for each of the data communication lines;

multi-line control means for selectively coupling the data communication lines to a particular one of the input-output channels;

processor means for reading an initiate input-output command from main memory;

the command comprising bits manifesting the particular input-output channel and bits manifesting the address in main memory of an input-output command associated with this channel;

the processor means reading the input-output command from main memory;

the command comprising bits indicating that a write-transparent operation is to be executed, bits manifesting a particular data communication line, bits manifesting a starting address in main memory and bits manifesting a terminating address in main memory;

means including the multi-line control means for storing the starting address and the terminating address, respectively, in the first and second word locations in the second section of the address memory reserved for the particular data communication line;

an address register;

the multi-line control means comprising means responsive to the allocation of access to main memory to the particular one of the input-output channels and to the selection of the particular one of the data communication lines for addressing the second section of the address memory and for effecting the writing of the contents of the first word location reserved for the particular data communication line into the address register;

means utilizing the contents of the address register for addressing the main memory and for reading from memory a character stored at the address manifested by the register;

the multi-line control means transmitting to the particular data communication line the character read from main memory;

the entire system being blind to any control code which may be manifested by the transmitted character;

means for incrementing by a predetermined amount the contents of the address register;

means for restoring the contents of the address register to the first word location in address memory reserved for the particular data communication line;

means for comparing the contents of the first and second word locations in address memory reserved for the particular data communication line; and means responsive to a determination of equality between the contents of the word locations for presenting a signal to the central control means indicating that the write-transparent operation has been executed.

5. A computer system comprising:

a main memory;

a plurality of input-output channels communicating with the memory;

central control means for allocating accesses to main memory by the input-output channels;

a plurality of remote stations;

a plurality of input-output control means coupling respective ones of the remote stations to respective ones of the input-output channels;

an address memory;

the address memory having a first and second word location reserved therein for each of the input-output channels;

processor means for reading an initiate input-output command from main memory;

the command comprising bits manifesting a particular one of the input-output channels and bits manifesting the address in main memory of an input-output command associated with this channel;

the processor means reading the input-output command from main memory;

the command comprising bits indicating that a read-transparent operation is to be executed, bits manifesting a starting address in main memory and bits manifesting a terminating address in main memory;

means including the central control means for storing the starting address and the terminating address, respectively, in the first and second word locations in address memory reserved for the particular input-output channel;

an address register;

the central control means comprising means responsive to the allocation of access to main memory to the particular one of the input-output channels for addressing the address memory and for effecting the writing of the contents of the first word location reserved for the particular channel into the address register;

the input-output control means associated with the particular input-output channel transmitting a character from its associated remote station to the particular input-output channel;

the entire system being blind to any control code which may be manifested by the transmitted character;

means utilizing the contents of the address register for addressing the main memory and for writing the transmitted character into the memory at the address manifested by the register;

means for incrementing by a predetermined amount the contents of the address register;

means for restoring the contents of the address register into the first word location in address memory reserved for the particular input-output channel;

means for comparing the contents of the first and second word locations in address memory reserved for the particular input-output channel; and means responsive to a determination of equality between the contents of the word locations for presenting a signal to the central control means indicating that the read-transparent operation has been executed.

References Cited

UNITED STATES PATENTS

| | | | |
|---|---|---|---|
| 3,283,306 | 11/1966 | Patrusky | 340—172.5 |
| 3,323,110 | 5/1967 | Oliaril et al. | 340—172.5 |
| 3,359,544 | 12/1967 | Macon et al. | 340—172.5 |

FOREIGN PATENTS

| | |
|---|---|
| 1,003,641 | Great Britain. |

PAUL J. HENON, Primary Examiner

P. R. WOODS, Assistant Examiner